US012650211B2

(12) United States Patent
Lee et al.

(10) Patent No.: US 12,650,211 B2
(45) Date of Patent: Jun. 9, 2026

(54) LAMP FOR VEHICLE

(71) Applicant: HYUNDAI MOBIS CO., LTD., Seoul (KR)

(72) Inventors: Hyun Soo Lee, Yongin-si (KR); Na Ram Jun, Yongin-si (KR); Tae Yang Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/290,677

(22) Filed: Aug. 5, 2025

(65) Prior Publication Data

US 2026/0153204 A1 Jun. 4, 2026

(30) Foreign Application Priority Data

Dec. 4, 2024 (KR) ........................ 10-2024-0178615

(51) Int. Cl.

| | |
|---|---|
| ***F21S 41/24*** | (2018.01) |
| ***F21S 41/147*** | (2018.01) |
| ***F21S 43/241*** | (2018.01) |
| ***F21S 43/243*** | (2018.01) |
| ***F21S 43/249*** | (2018.01) |
| ***F21W 103/55*** | (2018.01) |
| *F21Y 115/10* | (2016.01) |

(52) U.S. Cl.
CPC ............. *F21S 41/24* (2018.01); *F21S 41/147* (2018.01); *F21S 43/241* (2018.01); *F21S 43/243* (2018.01); *F21S 43/2492* (2024.05); *F21W 2103/55* (2018.01); *F21Y 2115/10* (2016.08)

(58) Field of Classification Search
CPC ........ F21S 41/24; F21S 41/147; F21S 43/241; F21S 43/243; F21S 43/2492; F21W 2103/55
USPC .......................................................... 362/459
See application file for complete search history.

(56) References Cited

U.S. PATENT DOCUMENTS

| | | | | |
|---|---|---|---|---|
| 6,102,559 | A * | 8/2000 | Nold | B60Q 1/2607 362/558 |
| 2016/0265734 | A1* | 9/2016 | Kanayama | F21S 45/48 |
| 2016/0337637 | A1* | 11/2016 | Hwang | G02F 1/133512 |
| 2016/0349438 | A1* | 12/2016 | Ma | G02B 6/0068 |
| 2022/0043262 | A1* | 2/2022 | Agemizu | B60K 35/23 |
| 2023/0258309 | A1* | 8/2023 | Suwa | F21S 41/24 362/475 |
| 2023/0280592 | A1* | 9/2023 | Nakamura | G02B 27/0172 385/38 |
| 2024/0427152 | A1* | 12/2024 | Robinson | G02B 27/0172 |

* cited by examiner

*Primary Examiner* — Toan C Ly
(74) *Attorney, Agent, or Firm* — NSIP Law

(57) ABSTRACT

A lamp for a vehicle, and a system therefor are provided. The lamp includes a light source, and a light guide part disposed at one side of the light source to receive light emitted from the light source. The light guide part includes a front surface portion, a rear surface portion, an upper surface portion, and a lower surface portion. The light source includes a first light source disposed rearward of the light guide part and facing the rear surface portion, and a second light source disposed above the light guide part and facing the upper surface portion. The lower surface portion includes a downward protruding region protruding downward, such that at least a part of light emitted from the second light source reaches the downward protruding region.

20 Claims, 4 Drawing Sheets

LAMP FOR VEHICLE

CROSS-REFERENCE TO RELATED APPLICATION

This application claims priority to and the benefit under 35 USC § 119(a) of Korean Patent Application No. 10-2024-0178615 filed in the Korean Intellectual Property Office on Dec. 4, 2024, the entire contents of which are incorporated herein by reference for all purposes.

BACKGROUND

1. Field

The present disclosure relates to a lamp for a vehicle, and more particularly, to a lamp for a vehicle, the lamp being capable of forming a plurality of light distribution patterns.

2. Description of the Related Art

Various types of vehicle lamps, which are classified depending on functions thereof, are mounted in a vehicle. For example, low beam lamps, high beam lamps, daytime running light (DRL) lamps, and the like are mounted on a front side of the vehicle.

In the related art, because various types of lamps are mounted together in vehicles, light-emitting surfaces formed by the lamps are different from one another, which causes a problem in that designs of the vehicles cannot meet consumer demands when the lamps are turned on. Furthermore, because various types of lamps are mounted in vehicles, which causes a problem in that spaces occupied by the lamps in the vehicles are excessively large.

SUMMARY

The present disclosure has been made in an effort to provide a lamp module for a vehicle, the lamp module having a structure in which one lamp for a vehicle may perform two or more functions, such that one light-emitting surface may be shared even in case that the lamps with different functions are turned on, thereby promoting differentiation in terms of designs of vehicles.

In order to achieve the above-mentioned object, one aspect of the present disclosure provides a lamp for a vehicle, the lamp including: a light source; and a light guide part disposed at one side of the light source and configured to receive light emitted from the light source, in which the light guide part includes: a front surface portion configured to define a front region of the light guide part; a rear surface portion configured to define a rear region of the light guide part; an upper surface portion configured to connect the front surface portion and the rear surface portion and configured to define an upper region of the light guide part; and a lower surface portion configured to connect the front surface portion and the rear surface portion and configured to define a lower region of the light guide part, in which the light source includes: a first light source disposed rearward of the light guide part and configured to face the rear surface portion; and a second light source disposed above the light guide part and configured to face the upper surface portion, and in which the lower surface portion includes a downward protruding region protruding downward and configured such that at least a part of light emitted from the second light source reaches the downward protruding region.

An optical axis of the second light source may be inclined downward and forward, and the downward protruding region may be disposed forward of the second light source.

The downward protruding region may include: a first downward protruding surface configured to define a rear surface of the downward protruding region; and a second downward protruding surface configured to define a front surface of the downward protruding region.

The first downward protruding surface and the second downward protruding surface may each have a flat shape, and the first downward protruding surface and the second downward protruding surface may meet together at a lower end of the downward protruding region.

An angle (α) defined between the first downward protruding surface and an upward/downward direction (H) may be larger than an angle (β) defined between the second downward protruding surface and the upward/downward direction (H).

The upper surface portion may include an upward protruding region protruding upward and configured to face the second light source.

A direction in which the upward protruding region protrudes may be parallel to a direction in which the first downward protruding surface protrudes.

A first plane, which is an imaginary plane including the first downward protruding surface, may be consistent with a second plane, which is an imaginary plane including a front surface of the upward protruding region, or the first plane may be positioned forward of the second plane.

A surface of the upward protruding region, which faces the second light source, may include a portion having a convex shape.

The lower surface portion may further include: a light guide protruding region spaced apart forward from the downward protruding region and protruding downward; and a lower reflection region disposed between the downward protruding region and the light guide protruding region.

A horizontal cross-section of a rear surface of the light guide protruding region may include a portion having a shape convex rearward.

The lower reflection region may have a stepped section formed at a boundary between one side surface based on a leftward/rightward direction (W) and the other side surface based on the leftward/rightward direction (W).

The light guide part may further include a light collection region formed between the upper surface portion and the lower surface portion and configured to face the first light source.

The light collection region may include a portion having a collimator shape.

Light, which is emitted from the first light source and totally reflected by an inner surface of an upper portion of the light collection region, may reach the lower reflection region.

The entire light guide part may be formed integrally.

In another general aspect, a lamp system includes: a light guide part including a front surface portion, a rear surface portion, an upper surface portion connected to the front surface portion and the rear surface portion, and a lower surface portion connected to the front surface portion and the rear surface portion; a first light source disposed rearward of the light guide part and configured to face the rear surface portion; a second light source disposed above the light guide part and configured to face the upper surface portion; and a controller configured to control the first light source and the second light source to form one or more light distribution patterns via the light guide part, wherein the lower surface portion includes a downward protruding region protruding downward and configured such that at least a part of light emitted from the second light source reaches the downward protruding region.

An optical axis of the second light source may be inclined downward and forward, and the downward protruding region may be disposed forward of the second light source.

The downward protruding region may include a first downward protruding surface configured to define a rear surface of the downward protruding region, and a second downward protruding surface configured to define a front surface of the downward protruding region.

The lower surface portion may further include a light guide protruding region spaced apart forward from the downward protruding region and protruding downward, and a lower reflection region disposed between the downward protruding region and the light guide protruding region.

According to the present disclosure, one lamp for a vehicle may perform two or more functions, such that one light-emitting surface may be shared even in case that the lamps with different functions are turned on, thereby promoting differentiation in terms of designs of the vehicles.

DETAILED DESCRIPTION

Hereinafter, a lamp for a vehicle according to the present disclosure will be described with reference to the drawings.

Lamp for Vehicle

Figure 1:
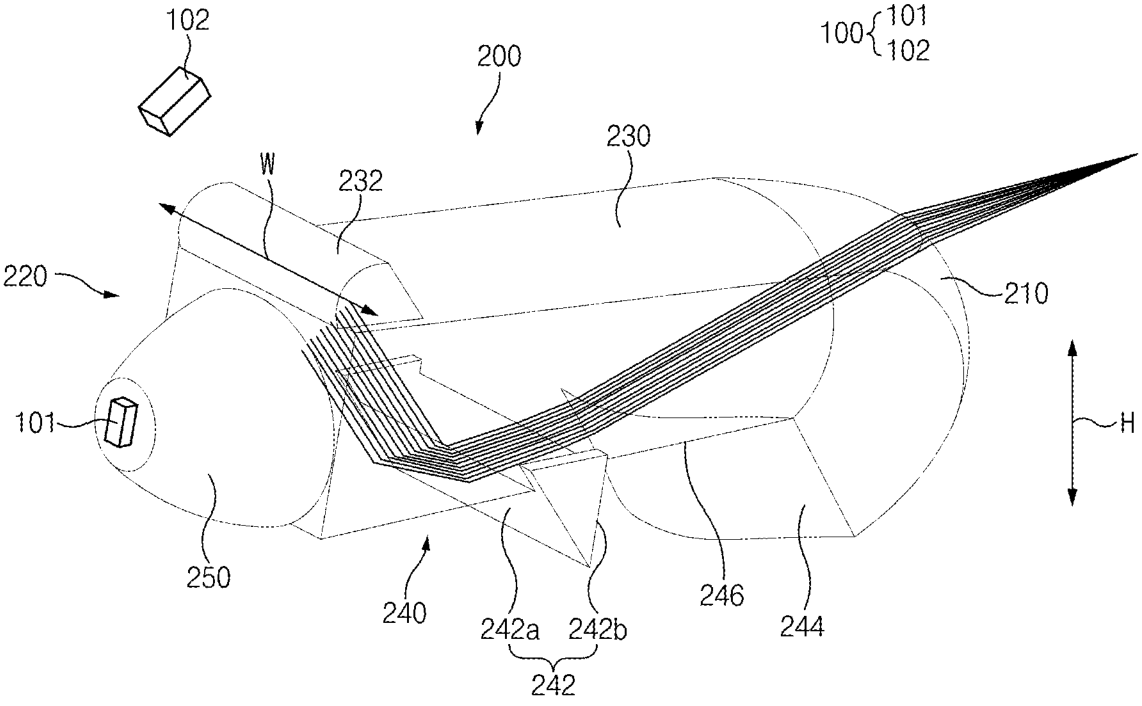
FIG. 1 is a perspective view of a lamp for a vehicle according to the present disclosure.
Figure 2:
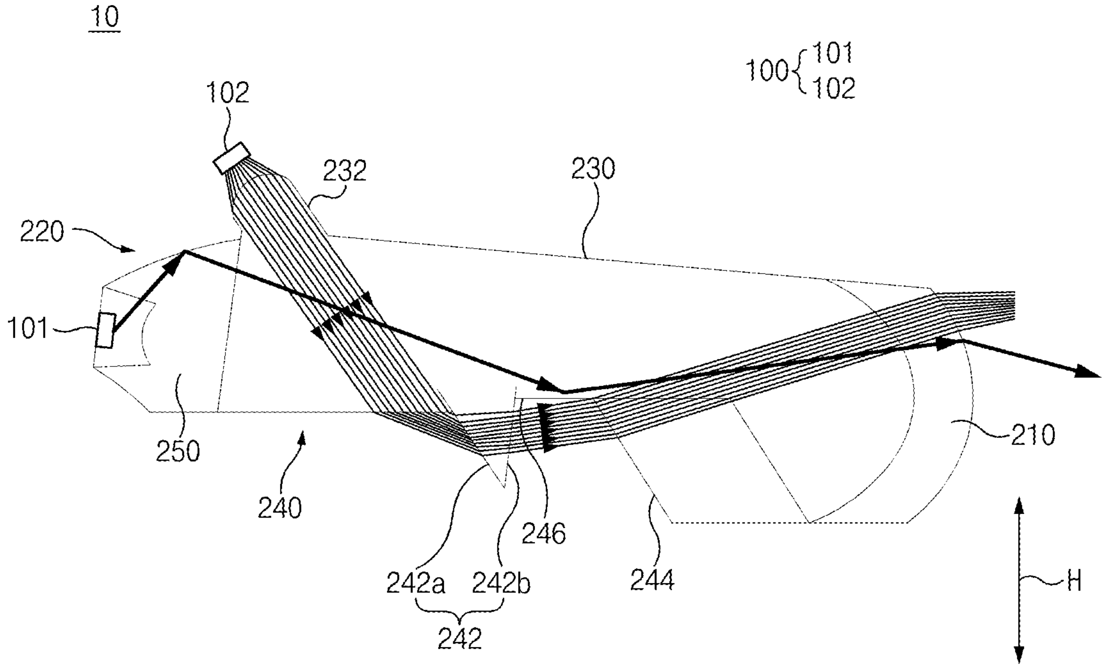
FIG. 2 is a side view of the lamp for a vehicle according to the present disclosure.
Figure 3:
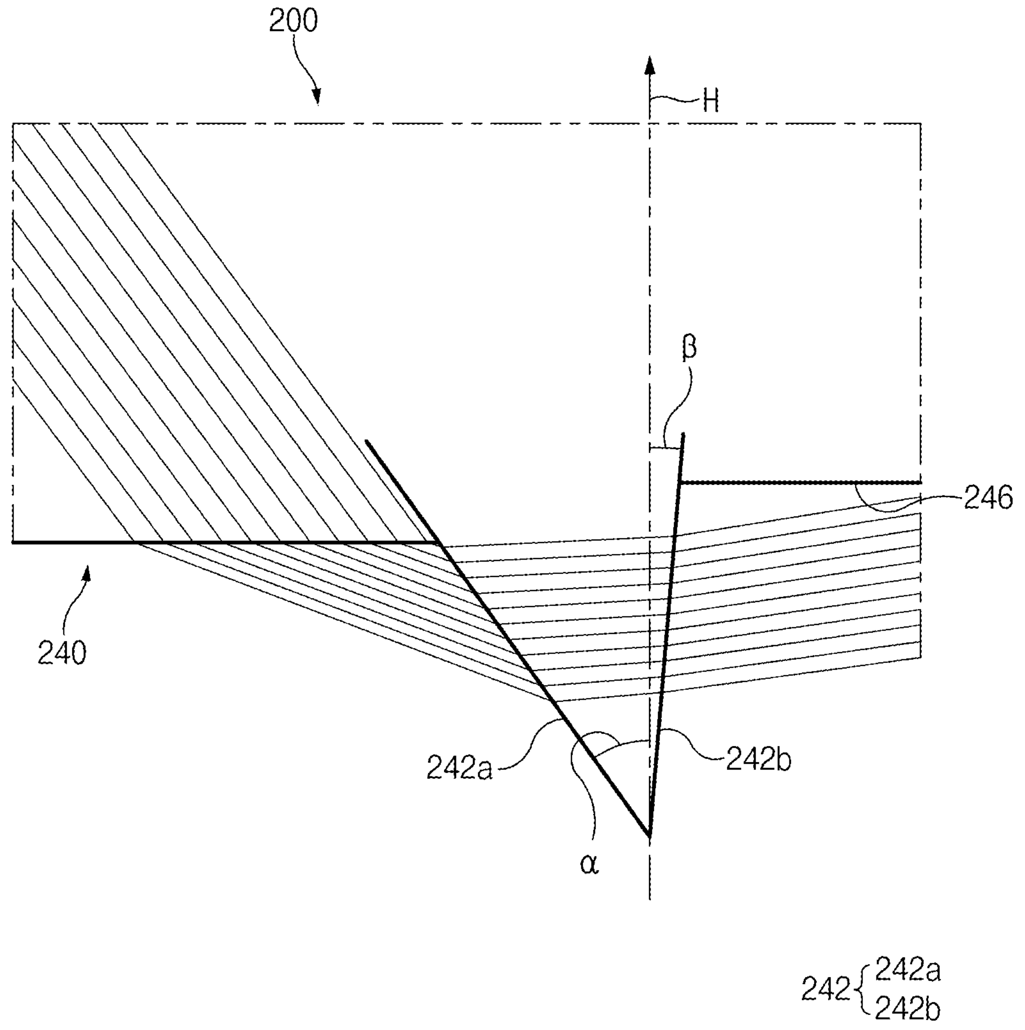
FIG. 3 is an enlarged view illustrating a downward protruding region of the lamp for a vehicle according to the present disclosure and the surroundings of the downward protruding region.
Figure 4:
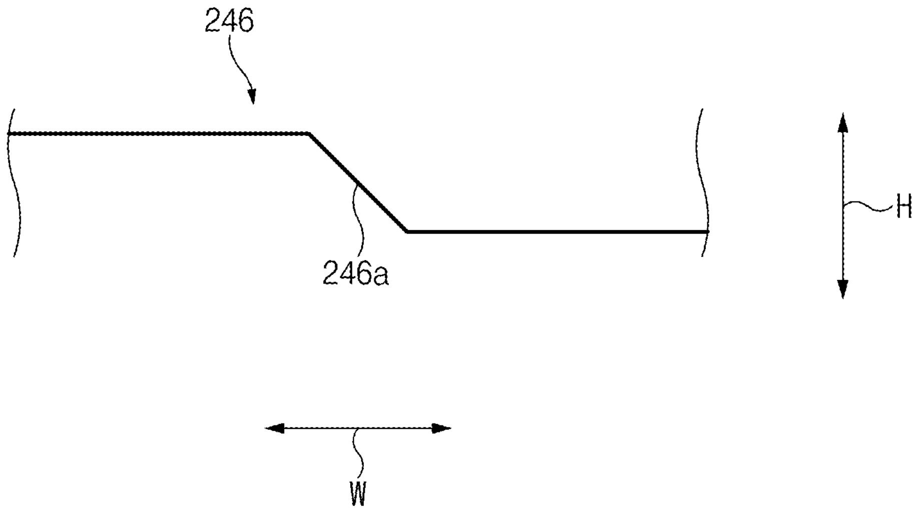
FIG. 4 is a view illustrating a cross-sectional structure of a stepped section formed on a light guide part of the lamp for a vehicle according to the present disclosure.

FIG. 1 is a perspective view of a lamp for a vehicle according to the present disclosure, and FIG. 2 is a side view of the lamp for a vehicle according to the present disclosure. FIG. 3 is an enlarged view illustrating a downward protruding region of the lamp for a vehicle according to the present disclosure and the surroundings of the downward protruding region, and FIG. 4 is a view illustrating a cross-sectional structure of a stepped section formed on a light guide part of the lamp for a vehicle according to the present disclosure.

A lamp for a vehicle (hereinafter, referred to as a 'lamp') according to the present disclosure may be a lamp module capable of forming two or more types of light distribution patterns. That is, the lamp according to the present disclosure may individually form a first light distribution pattern and a second light distribution pattern different from the first light distribution pattern. For example, the first light distribution pattern may be a low beam pattern, and the second light distribution pattern may be a daytime running light (DRL) pattern. However, the types of the first and second light distribution patterns are not limited to the above-mentioned contents. Various types of beam patterns may be applied.

With reference to FIGS. 1 to 3, a lamp 10 according to the present disclosure may include a light source 100, and a light guide part 200 provided at one side of the light source 100 and configured to receive light emitted from the light source 100. The entire light guide part 200 according to the present disclosure may be a lens formed integrally. Therefore, according to the present disclosure, first and second light distribution patterns may be formed by one integrated lens, i.e., the light guide part 200. Even in case that the light distribution patterns with different functions are formed, one light-emitting surface may be shared by means of one light guide part, thereby promoting differentiation in terms of designs of the vehicles.

Meanwhile, a surface of the light guide part 200 may be divided into a plurality of regions depending on positions. More specifically, the light guide part 200 may include a front surface portion 210 configured to define a front region of the light guide part 200, a rear surface portion 220 configured to define a rear region of the light guide part 200, an upper surface portion 230 configured to connect the front surface portion 210 and the rear surface portion 220 and configured to define an upper region of the light guide part 200, and a lower surface portion 240 configured to connect the front surface portion 210 and the rear surface portion 220 and configured to define a lower region of the light guide part 200.

In addition, the light source 100 may include a first light source 101 disposed rearward of the light guide part 200 and provided to face the rear surface portion 220, and a second light source 102 disposed above the light guide part 200 and provided to face the upper surface portion 230. For example, the first light source 101 and the second light source 102 may each be an LED. According to the present disclosure, light emitted from the first light source 101 may form the first light distribution pattern (e.g., a low beam distribution pattern), and light emitted from the second light source 102 may form the second light distribution pattern (e.g., a DRL distribution pattern).

That is, according to the present disclosure, at least a part of the light emitted from the first light source 101 may pass through the rear surface portion 220 of the light guide part 200 and then exit to the outside, thereby forming the first light distribution pattern. At least a part of the light emitted from the second light source 102 may pass through the upper surface portion 230 of the light guide part 200 and then exit to the outside, thereby forming the second light distribution pattern. More particularly, the second light distribution pattern may be formed above the first light distribution pattern. Hereinafter, the features of the light guide part 200 for exhibiting the above-mentioned functions will be described in detail.

As illustrated in FIGS. 1 and 2, according to the present disclosure, the lower surface portion 240 may include a downward protruding region 242 protruding downward and configured such that at least a part of the light emitted from the second light source 102 reaches the downward protruding region 242. According to the present disclosure, the light, which is emitted from the second light source 102 and passes through the upper surface portion 230 of the light guide part 200, may exit to the outside via the downward protruding region 242, thereby forming the second light distribution pattern.

More specifically, the light, which is emitted from the second light source 102 and passes through the upper surface portion 230, may be primarily refracted while exiting the light guide part 200 through the lower surface portion 240 of the light guide part 200 and then enter the light guide part 200 again through one side of the downward protruding region 242, and the light, which exits from the light guide part 200 again through the other side of the downward protruding region 242, may form the second light distribution pattern.

In particular, according to the present disclosure, the above-mentioned second light distribution pattern may be a DRL distribution pattern. In this case, the second light distribution pattern may be formed by the light propagating relatively upward. To this end, according to the present disclosure, the light emitted from the second light source 102 generally propagates downward until the light exits downward from the light guide part 200 via the lower surface portion 240 of the light guide part 200. Further, the light enters the downward protruding region 242 and generally propagates upward. Meanwhile, in the present specification, an optical path, which is set until the light emitted from the second light source 102 exits downward via the lower surface portion 240 of the light guide part 200, will be referred to as a 'front optical path' for the light emitted from the second light source 102, and an optical path, which is set after the light exiting downward via the lower surface portion 240 of the light guide part 200 enters the downward protruding region 242 again, will be referred to as a 'rear optical path' for the light emitted from the second light source 102.

Meanwhile, an optical axis of the second light source 102 may be inclined downward and forward, and the downward protruding region 242 may be provided forward of the second light source 102, such that the front optical path for the light emitted from the second light source 102 entirely propagates forward and downward.

Meanwhile, the above-mentioned downward protruding region 242 may include a plurality of surfaces. That is, with reference to FIGS. 2 and 3, the downward protruding region 242 may include a first downward protruding surface **242*a* configured to define a rear surface of the downward protruding region 242, and a second downward protruding surface 242*b* configured to define a front surface of the downward protruding region 242. For example, the first downward protruding surface 242*a* and the second downward protruding surface 242*b* may each have a flat shape, and a lower end of the downward protruding region 242 may have a pointy cutting-edge shape. It may be understood that the first downward protruding surface 242*a* and the second downward protruding surface 242*b* meet together at the lower end of the downward protruding region 242. Alternatively, it may be understood that a cross-section, which is made by cutting the downward protruding region 242** perpendicularly to a leftward/rightward direction of the lamp, has a triangular shape.

As described above, the light emitted from the first light source 101 may form the low beam distribution pattern, and the light emitted from the second light source 102 may form the DRL distribution pattern. In this case, as illustrated in FIG. 3, an angle $\alpha$ defined between the first downward protruding surface **242*a* and an upward/downward direction H of the lamp may be larger than an angle $\beta$ defined between the second downward protruding surface 242*b* and the upward/downward direction H of the lamp. This may be to prevent a situation in which an excessive amount of light, which is emitted from the second light source 102 and reaches the downward protruding region 242, propagates upward, which causes glare. A controller (not shown) may control the first light source 101 and the second light source 102 to form one or more light distribution patterns via the light guide part 200**.

Meanwhile, with continued reference to FIGS. 1 and 2, the upper surface portion 230 may include an upward protruding region 232 protruding upward and provided to face the second light source 102. The upward protruding region 232 may be a region of the light guide part 200 where the light emitted from the second light source 102 reaches first. The upward protruding region 232 may serve to collect the light emitted from the second light source 102.

In this case, a direction in which the upward protruding region 232 protrudes from the light guide part 200 may not be parallel to the upward/downward direction H. For example, the direction in which the upward protruding region 232 protrudes may be parallel to a direction in which the first downward protruding surface **242*a* protrudes. In addition, a first plane, which is an imaginary plane including the first downward protruding surface 242*a*, may be consistent with a second plane that is an imaginary plane including a front surface of the upward protruding region 232**. Alternatively, the first plane may be positioned forward of the second plane.

According to the above-mentioned configuration, the light, which is emitted from the second light source 102 and enters the light guide part 200 through the upward protruding region 232, may be refracted forward from the light guide part 200, exit downward through the lower surface portion 240, and then enter the light guide part 200 again through the first downward protruding surface **242*a* of the downward protruding region 242. Thereafter, the light may propagate forward in the downward protruding region 242 and then exit from the downward protruding region 242 and the light guide part 200 through the second downward protruding surface 242*b*. Meanwhile, for example, a surface of the upward protruding region 232, which faces the second light source 102**, may include a portion having a convex shape.

With continued reference to FIGS. 1 and 2, the lower surface portion 240 may further include a light guide protruding region 244 spaced apart forward from the downward protruding region 242 and protruding downward, and a lower reflection region 246 provided between the downward protruding region 242 and the light guide protruding region 244.

The light guide protruding region 244 may be configured such that the light emitted from the second light source 102 and exiting the downward protruding region 242 enters the light guide protruding region 244 again. The light entering the light guide protruding region 244 may move upward, pass through the front surface portion 210 of the light guide part 200, and then finally exit from the light guide part 200, such that the second light distribution pattern may be formed. Meanwhile, the lower reflection region 246 may be configured to be involved in forming the first light distribution pattern. That is, the light emitted from the first light source 101 may be reflected by the lower reflection region 246 and then move upward and forward. Thereafter, the light may pass through the front surface portion 210 of the light guide part 200 and finally exit from the light guide part 200, such that the second light distribution pattern may be formed.

For example, a horizontal cross-section of a rear surface of the light guide protruding region 244 may include a portion having a shape convex rearward. This is to maximize luminous efficiency by collecting the light emitted from the second light source 102. More particularly, the horizontal cross-section of the entire rear surface of the light guide protruding region 244 may have a shape convex rearward.

Meanwhile, as described above, the first light distribution pattern may be the low beam distribution pattern. That is, the light emitted from the first light source 101 may form the low beam distribution pattern. In this case, as illustrated in FIG. 4, the lower reflection region 246 may have a stepped section 246*a* formed at a boundary between one side surface based on a leftward/rightward direction W and the other side surface based on the leftward/rightward direction W. Based on the boundary of the stepped section 246*a*, one side surface of the lower reflection region 246 based on the leftward/rightward direction W and the other side surface of the lower reflection region 246 based on the leftward/rightward direction W may be different in height in the upward/downward direction H from each other. The above-mentioned stepped section 246*a* may have a shape corresponding to a cut-off line defined at an upper boundary of the low beam distribution pattern.

In addition, the light guide part 200 may further include a light collection region 250 formed between the upper surface portion 230 and the lower surface portion 240 and provided to face the first light source 101. For example, an outer surface of the light collection region 250 may have a curved shape as a whole. More particularly, the light collection region 250 may include a portion having a collimator shape or have a collimator shape.

According to the present disclosure, the light, which is emitted from the first light source 101 and totally reflected by an inner surface of an upper portion of the light collection region 250, may reach the lower reflection region 246, and the light reflected by the lower reflection region 246 may move upward and forward and then exit to the outside through the front surface portion 210 of the light guide part 200.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

What is claimed is:

1. A lamp for a vehicle, the lamp comprising:
a light source; and
a light guide part disposed at one side of the light source and configured to receive light emitted from the light source,
wherein the light guide part comprises:
a front surface portion configured to define a front region of the light guide part;
a rear surface portion configured to define a rear region of the light guide part;
an upper surface portion configured to connect the front surface portion and the rear surface portion and configured to define an upper region of the light guide part; and
a lower surface portion configured to connect the front surface portion and the rear surface portion and configured to define a lower region of the light guide part,
wherein the light source comprises:
a first light source disposed rearward of the light guide part and configured to face the rear surface portion; and
a second light source disposed above the light guide part and configured to face the upper surface portion, and
wherein the lower surface portion comprises a downward protruding region protruding downward and configured such that at least a part of light emitted from the second light source reaches the downward protruding region.

2. The lamp of claim 1, wherein an optical axis of the second light source is inclined downward and forward, and the downward protruding region is disposed forward of the second light source.

3. The lamp of claim 1, wherein the downward protruding region comprises:
a first downward protruding surface configured to define a rear surface of the downward protruding region; and
a second downward protruding surface configured to define a front surface of the downward protruding region.

4. The lamp of claim 3, wherein the first downward protruding surface and the second downward protruding surface each have a flat shape, and
wherein the first downward protruding surface and the second downward protruding surface meet together at a lower end of the downward protruding region.

5. The lamp of claim 3, wherein an angle (α) defined between the first downward protruding surface and an upward/downward direction (H) is larger than an angle (β) defined between the second downward protruding surface and the upward/downward direction (H).

6. The lamp of claim 3, wherein the upper surface portion comprises an upward protruding region protruding upward and configured to face the second light source.

7. The lamp of claim 6, wherein a direction in which the upward protruding region protrudes is parallel to a direction in which the first downward protruding surface protrudes.

8. The lamp of claim 6, wherein a first plane, which is an imaginary plane comprising the first downward protruding surface, is consistent with a second plane, which is an imaginary plane comprising a front surface of the upward protruding region, or the first plane is positioned forward of the second plane.

9. The lamp of claim 6, wherein a surface of the upward protruding region, which faces the second light source, comprises a portion having a convex shape.

10. The lamp of claim 1, wherein the lower surface portion further comprises:
a light guide protruding region spaced apart forward from the downward protruding region and protruding downward; and
a lower reflection region disposed between the downward protruding region and the light guide protruding region.

11. The lamp of claim 10, wherein a horizontal cross-section of a rear surface of the light guide protruding region comprises a portion having a shape convex rearward.

12. The lamp of claim 10, wherein the lower reflection region has a stepped section formed at a boundary between one side surface based on a leftward/rightward direction (W) and the other side surface based on the leftward/rightward direction (W).

13. The lamp of claim 10, wherein the light guide part further comprises a light collection region formed between the upper surface portion and the lower surface portion and configured to face the first light source.

14. The lamp of claim 13, wherein the light collection region comprises a portion having a collimator shape.

15. The lamp of claim 13, wherein light, which is emitted from the first light source and totally reflected by an inner surface of an upper portion of the light collection region, reaches the lower reflection region.

16. The lamp of claim 1, wherein the entire light guide part is formed integrally.

17. A lamp system comprising:

a light guide part comprising:

a front surface portion;

a rear surface portion;

an upper surface portion connected to the front surface portion and the rear surface portion; and a lower surface portion connected to the front surface portion and the rear surface portion;

a first light source disposed rearward of the light guide part and configured to face the rear surface portion;

a second light source disposed above the light guide part and configured to face the upper surface portion; and a controller configured to control the first light source and the second light source to form one or more light distribution patterns via the light guide part, wherein the lower surface portion comprises a downward protruding region protruding downward and configured such that at least a part of light emitted from the second light source reaches the downward protruding region.

18. The lamp system of claim 17, wherein an optical axis of the second light source is inclined downward and forward, and the downward protruding region is disposed forward of the second light source.

19. The lamp system of claim 17, wherein the downward protruding region comprises:

a first downward protruding surface configured to define a rear surface of the downward protruding region; and a second downward protruding surface configured to define a front surface of the downward protruding region.

20. The lamp system of claim 17, wherein the lower surface portion further comprises:

a light guide protruding region spaced apart forward from the downward protruding region and protruding downward; and a lower reflection region disposed between the downward protruding region and the light guide protruding region.

* * * * *